(12) United States Patent
Kobayashi

(10) Patent No.: US 6,648,795 B2
(45) Date of Patent: Nov. 18, 2003

(54) TRANSMISSION SYSTEM FOR VEHICLE

(75) Inventor: Toshio Kobayashi, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/955,148

(22) Filed: Sep. 19, 2001

(65) Prior Publication Data

US 2002/0035010 A1 Mar. 21, 2002

(30) Foreign Application Priority Data

Sep. 20, 2000 (JP) ........................ 2000-285015

(51) Int. Cl.[7] .................. F16H 61/48; F16H 47/00
(52) U.S. Cl. .................. 477/54; 477/57; 477/58; 74/335; 74/732.1
(58) Field of Search .................. 477/54, 57, 58, 477/61, 64, 168; 192/3.27, 3.26, 3.29; 74/331, 335, 333, 732.1

(56) References Cited

U.S. PATENT DOCUMENTS

| 2,747,430 A | * | 5/1956 | Forster et al. | 192/221 |
| 2,749,775 A | * | 6/1956 | Simpson | 192/3.26 |
| 2,950,630 A | * | 8/1960 | Zeidler | 192/3.26 |
| 3,851,544 A | * | 12/1974 | Herman | 475/32 |
| 5,560,249 A | * | 10/1996 | Nellums | 477/3 |
| 5,881,852 A | * | 3/1999 | Fukushima | 192/3.27 |
| 2001/0013258 A1 | | 8/2001 | Kobayashi | 74/359 |

FOREIGN PATENT DOCUMENTS

| JP | 53-22215 | 10/1973 |
| JP | 2000-55184 | 2/2000 |

\* cited by examiner

Primary Examiner—Sherry Estremsky
Assistant Examiner—Tisha D. Lewis
(74) Attorney, Agent, or Firm—Smith, Gambrell & Russell LLP

(57) ABSTRACT

Vehicle automatic transmission system having input shaft drive gears, output shaft driven gears meshing with the drive gears, a torque converter disposed between an engine crankshaft and the input shaft, synchromesh mechanisms for synchronously engaging the drive gears with the driven gears and a shift controller for automatically actuating the synchromesh mechanisms to obtain a required gear ratio. A lock-up clutch is incorporated in the torque converter for connecting a turbine shaft of the torque converter with the crankshaft. An electronically controlled throttle valve automatically operates to reduce crank shaft rotation speed when the gear is shifted, a bypass clutch transmits torque from the input shaft to the output shaft when the gear is shifted while the electronically controlled throttle valve reduces rotation speed of the crankshaft, and an input clutch selectively controls torque transmission from the crankshaft to the input shaft when the gear is shifted.

14 Claims, 5 Drawing Sheets

TRANSMISSION SYSTEM FOR VEHICLE

BACKGROUND OF THE INVENTION

1. Field of the Invention

The present invention relates to a transmission system for a vehicle and more particularly to an automatic transmission whose gear trains are originated from those of a conventional manual transmission.

2. Discussion of Prior Art

Generally, a manual transmission, in which the gear is manually shifted, has an input shaft directly connected to an engine and including a plurality of drive gears and has an output shaft including a plurality of driven gears paired with the corresponding drive gears and connected to drive wheels. That is, there are provided a plurality of shift gear trains between the input shaft and the output shaft. When a gear is changed, after a clutch is disengaged, changeover mechanisms such as a synchromesh mechanism are manually operated to change over paired shift gear trains and then the clutch is engaged. This sequence of manual operations accomplishes a gear shift of a vehicle.

The manual transmission can be converted into an automatic transmission by replacing the sequence of manual operations with automatic operations using hydraulic actuators. This type of automatic transmission has advantages such as a small number of components and has a good transmission efficiency of power and the like, compared to a conventional automatic transmission primarily constituted by planetary gears, friction engagement elements (clutches, brakes) and the like.

This type automatic transmission having a plurality of shift gear trains is called an Automated Manual Transmission (hereinafter, referred to as "AMT"). Japanese Patent Application Laid-open No. Toku-Kai 2000-55184 discloses an AMT including a main clutch (dry type clutch) for changing over the connection of a crank shaft with an input shaft between an engagement condition and a disengagement condition and a bypass clutch (hydraulically operated multiple disc clutch) for transmitting torque from the input shaft to an output shaft to prevent a so-called "torque drop". When the main clutch changes an engagement condition, the bypass clutch is engaged by hydraulic pressure so as to prevent an abrupt drop of output torque when the gear is shifted and thus a shift shock can be alleviated.

However, a prior art dry clutch type AMT has difficulty generating such a positive and continuous creep for a long time as obtainable in a conventional torque converter type automatic transmission. As a result, this type transmission provides a driver with an awkward drive feeling different from that experienced with a conventional automatic transmission vehicle when a vehicle travels at very low speeds, such as when parking, starting on grades and the like. In order to generate a creep in AMT and to eliminate such awkwardness from AMT, it is necessary to positively apply a slip control to the main clutch of AMT for engaging or disengaging a crank shaft with an input shaft. However, in designing the main clutch, it is very difficult to satisfy both characteristics, a characteristic for smoothly transmitting power of an engine to the input shaft and a characteristic for enduring continuous slippage.

Further, a complicated slip control of the transmission system and some forced cooling device are required, this increasing the manufacturing cost of the transmission.

In a case where a conventional torque converter is incorporated into a clutch housing for a manual transmission vehicle, it is easy to obtain a creep effect and a torque amplitude effect but a continuous delivery of drag torque of the torque converter incurs failures such as gear clash unless the torque delivery is shut off at gearshifting.

Japanese Patent Application Laid-open No. Toku-Kou-Shou 53-22215 discloses a semiautomatic transmission in which a manual transmission is equipped with a torque converter. The semiautomatic transmission is provided with a friction clutch for delivering or shutting off power of an engine between the output side of the torque converter and the input side of the transmission. When shifting gears, the friction clutch is released based on a signal from a shift lever and then synchromesh mechanisms are changed over. In this case, since it is difficult to install a hydraulically controlled lock-up clutch for the structural reason, the torque converter is always in a slip condition and accordingly improved fuel economy can not be expected. Further, this transmission has disadvantages in a shift shock which occurs when the friction clutch is reengaged and a shift time elongated by the release and reengagement actions of the friction clutch.

SUMMARY OF THE INVENTION

It is an object of the present invention to provide an automatic transmission having a plurality of shift gear trains capable of preventing a torque drop when the gear is shifted. It is another object of the present invention to provide an automatic transmission having a plurality of shift gear trains, capable of regulating transmission torque according to vehicle running conditions.

To achieve the objects, the automatic transmission system for a vehicle having a plurality of drive gears mounted on an input shaft, a plurality of driven gears mounted on an output shaft and meshing with the drive gears, a torque converter disposed between a crankshaft of an engine and the input shaft, synchromesh mechanisms for synchronously engaging the drive gears with the driven gears and a shift controller for automatically actuating the synchromesh mechanisms so as to obtain a required gear ratio, includes a lock-up clutch incorporated in the torque converter for connecting a turbine shaft of the torque converter with the crankshaft, an electronically controlled throttle valve for automatically operating to reduce a rotation speed of the crank shaft when the gear is shifted, a bypass clutch for transmitting torque from the input shaft to the output shaft when the gear is shifted while the electronically controlled throttle valve operates to reduce a rotation speed of the crankshaft, and an input clutch provided between an output element of the torque converter and the input shaft for selectively controlling a torque transmission from the crankshaft to the input shaft when the gear is shifted.

DETAILED DESCRIPTION OF PREFERRED EMBODIMENT

Figure 1:
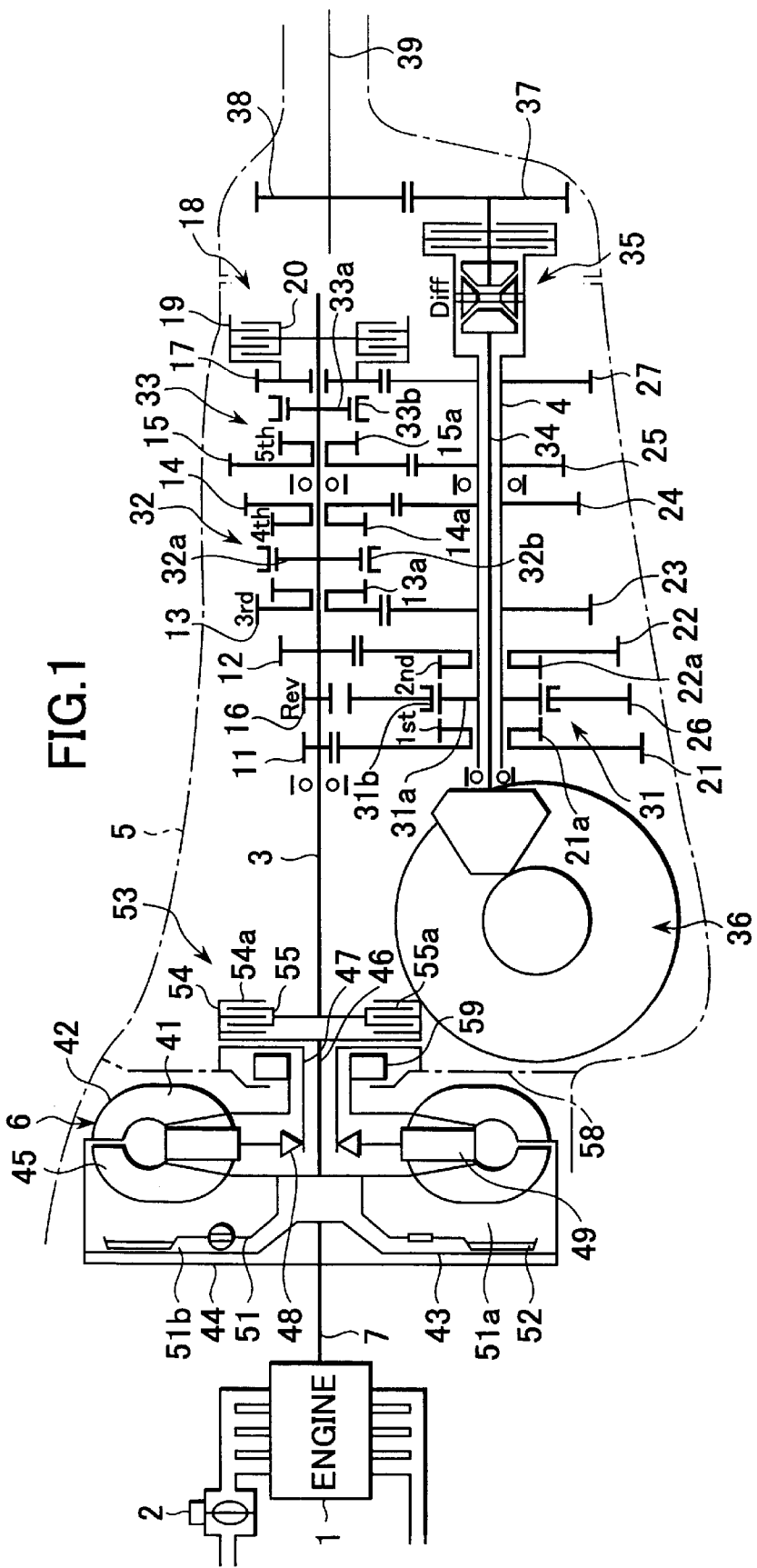
FIG. 1 is a skeleton diagram showing a transmission system for a vehicle according to a first embodiment of the present invention.

Referring to FIG. 1, an engine 1 is provided with an electronic control throttle valve 2 for controlling engine torque and engine speeds. Normally, the electronically controlled throttle valve 2 is opened and closed by output signals from an electronic control unit (not shown) according to the amount of depression of an accelerator pedal (not shown) to control the engine 1. Further, when needed, the electronically controlled throttle valve 2 is opened and closed to control the engine 1 based on a preestablished table irrespective of the amount of depression of the accelerator pedal.

Further, a transmission system for transmitting power of the engine 1 to driving wheels is exemplified as a transmission system used for a four wheel drive vehicle in this embodiment. The transmission system is mounted on a vehicle in a longitudinal direction thereof and has an input shaft 3 connected to the engine 1 and an output shaft 4 connected to driving wheels and disposed in parallel with the input shaft 3. These input and output shafts 3, 4 are arranged in a longitudinal direction of the vehicle in a transmission case 5. The input shaft 3 is connected through a torque converter 6 to a crank shaft 7 of the engine 1.

Drive gears 11, 12 for the $1^{st}$ gear ratio and the $2^{nd}$ gear ratio respectively are fixed to the input shaft 3 and further drive gears 13, 14 and 15 for the $3^{rd}$, $4^{th}$ and $5^{th}$ gear ratios respectively are rotatably mounted on the input shaft 3. Further, driven gears 21, 22 for the $1^{st}$ and $2^{nd}$ gear ratios respectively are rotatably mounted on the output shaft 4 and driven gears 23, 24 and 25 for the $3^{rd}$, $4^{th}$ and $5^{th}$ gear ratios respectively are fixed to the output shaft 4. Respective drive gears 11 to 15 mesh with respective driven gears 21 to 25 to form respective shift gear trains. The gear is shifted is by changing over the shift gear trains. Further, a drive gear 16 for reverse speed is secured to the input shaft 1.

The output shaft 4 is provided with a first synchromesh mechanism 31 between the driven gear 21 for the $1^{st}$ gear ratio and the driven gear 22 for the $2^{nd}$ gear ratio. The input shaft 3 is provided with a second synchromesh mechanism 32 between the drive gear 13 for the $3^{rd}$ gear ratio and the drive gear 14 for the 4 gear ratio and further the input shaft 3 is provided with a third synchromesh mechanism 33 adjacent to the drive gear 15 for the $5^{th}$ gear ratio.

The synchromesh mechanism 31 includes a synchronizer hub 31a secured to the output shaft 4 and a synchronizer sleeve 31b constantly meshing with the synchronizer hub 31a. When the synchronizer sleeve 31b meshes with a spline 21a integrally formed with the driven gear 21 for $1^{st}$ gear ratio, the gear ratio is established to the $1^{st}$ gear ratio and when the synchronizer sleeve 31b meshes with a spline 22a integrally formed with the driven gear 22 for the $2^{nd}$ gear ratio, the gear ratio is established to the $2^{nd}$ gear ratio.

Other synchromesh mechanisms 32, 33 include synchronizer hubs 32a, 33a secured to the input shaft 3 and synchronizer sleeves 32b, 33b constantly meshing with the synchronizer hubs 32a, 33a, respectively. When these synchronizer sleeves 32b, 33b are engaged with either of the corresponding splines 13a, 14a and 15a, the gear ratio is established to either of the $3^{rd}$ to $5^{th}$ gear ratios.

The traveling in an axial direction and engagement with the splines 11a, 12a, 13a, 14a and 15a of the respective synchronizer sleeves 31b, 32b and 33b are performed by a hydraulic actuator 67.

The synchronizer sleeve 31b of the first synchromesh mechanism 31 is provided with a driven gear 26 for reverse speed. Further, an idler gear (not shown) is slidably mounted on an idler shaft (not shown) in parallel with the input and output shafts 3, 4 respectively so as to axially travel between positions where the reverse drive gear 16 is engaged and disengaged with the driven gear 26. Accordingly, when the idler gear travels to mesh with the reverse drive gear 16 and the reverse driven gear 26 while the synchronizer sleeve 31b is a neutral position, the output shaft 4 rotates in a reverse direction.

The output shaft 4 is hollowed around the center thereof and a front wheel output shaft 34 is coaxially incorporated in the hollow. The output shaft 4 is connected with the front wheel output shaft 34 through a center differential 35 and the front wheel output shaft 34 is connected with a front wheel drive shaft (not shown) through a front differential 36. Further, the center differential 35 is connected with a rear wheel output shaft 39 through a drive gear 37 and a driven gear 38 and the rear output shaft 39 is connected with a rear wheel drive shaft (not shown) through a rear differential (not shown).

A bypass gear 17 of the drive side is rotatably mounted on the input shaft 3 and a bypass gear 27 of the driven side is secured to the output shaft 4. These gears 17, 27 are constantly in a meshing condition. The input shaft 3 is provided with a bypass clutch 18 which comprises a clutch hub 20 fixed to the input shaft 3 and a clutch drum 19 fixed to the bypass gear 17. The clutch drum 19 is provided with a plurality of clutch discs of the drive side and the clutch hub 20 is provided with a plurality of clutch discs of the driven side. The clutch discs of the drive side are disposed in interleaving relation to the clutch discs of the driven side. Power of the input shaft 3 is transmitted to the output shaft 4 through the bypass clutch 18 by pressing those clutch discs by means of hydraulic pressure in an axial direction. When releasing those clutch discs, power transmission is disconnected between the input shaft 3 and the output shaft 4.

Figure 2:
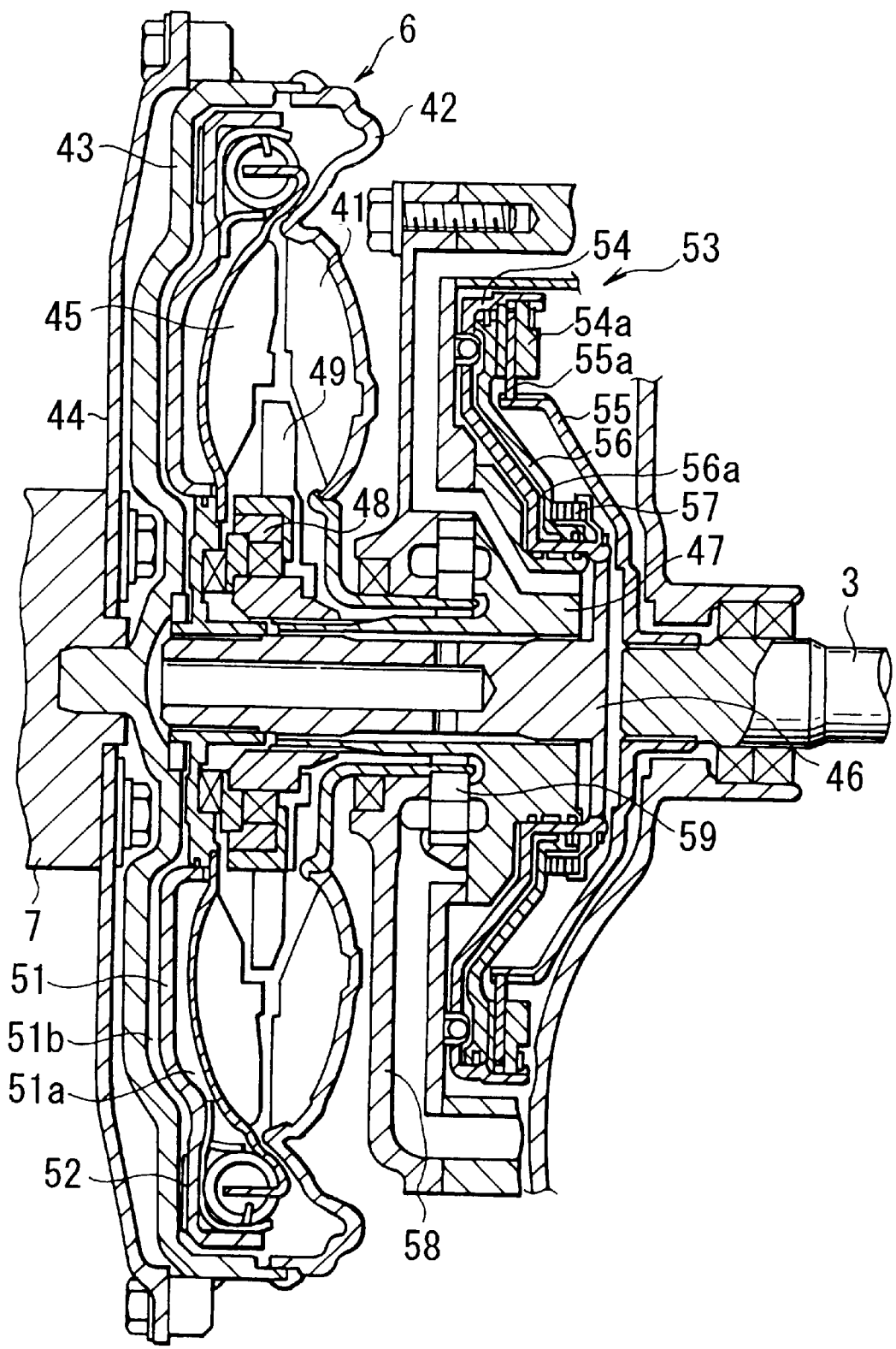
FIG. 2 is an enlarged sectional view of FIG. 1.

As shown in FIG. 2, the torque converter 6 has an outer shell 42 on the pump side including a pump impeller 41 and a front cover 43 secured to the outer shell 42. The front cover 43 is secured to a drive plate 44 integrally connected with the crankshaft 7. A turbine runner 45 disposed opposite to the pump impeller 41 is directly connected with a turbine shaft 46 through a spline. The turbine shaft 46 is rotatably incorporated in a hollow supporting shaft 47 and a stator 49 is provided on the supporting shaft 47 through an one-way clutch 48. The pump side outer shell 42 and front cover 43 are an input element of the torque converter 6 respectively and the turbine runner 45 and turbine shaft 46 are an output element of the torque converter 6 respectively.

A lock-up clutch 51 is fitted over the turbine shaft 46 in such a manner that power can be transmitted when the lock-up clutch 51 is pressed on the front cover 43. There is provided an apply chamber 51a to which hydraulic pressure is fed to press the lock-up clutch 51 on the front cover 43 on one side of the lock-up clutch 51 and there is provided a release chamber 51b from which hydraulic pressure is released to disengage the lock-up clutch 51 on the other side thereof. When hydraulic pressure is fed to the release chamber 51b and is circulated through the apply chamber 51a, the lock-up clutch 51 is released and the torque converter 6 is operative. On the other hand, when hydraulic pressure is fed to the apply chamber 51a and hydraulic pressure in the release chamber 51b is reduced, a clutch disc 52 of the lock-up clutch 51 is pressed by the front cover 43 to produce a lock-up condition. The lock-up clutch 51 is engaged when vehicle speed exceeds a specified value based on a table parameterizing vehicle speeds and accelerator pedal opening angles. Thus, power of the crankshaft 7 is transmitted to the turbine shaft 46 through the torque converter 6 or the lock-up clutch 51.

There is provided an input clutch 53 between the turbine shaft 46 and the input shaft 3. The input clutch 53 comprises a clutch drum 54 fixed to the turbine shaft 46 and a clutch hub 55 secured to the input shaft 3 through a spline. When clutch drive discs 54a mounted on the clutch drum 54 is engaged with clutch driven discs 55a mounted on the clutch hub 55, the turbine shaft 46 is connected with the input shaft 3. When the engagement is released, the turbine shaft 46 is disconnected from the input shaft 3.

As shown in FIG. 2, a clutch piston 56 is mounted in the clutch drum 54. When hydraulic pressure is supplied to an oil chamber 56a, the clutch drive discs 54a are engaged with the clutch driven discs 55a and when hydraulic pressure is stopped to be supplied, the engagement is released by spring force of a spring member 57.

An oil pump 59 is incorporated in a supporting wall 58 integrally formed with the transmission case 5. A rotor of the oil pump 59 is driveably connected with an extension member of the pump side outer shell 42 of the torque converter 6 and is driven by the crankshaft 7 through the pump side outer shell 42. Hydraulic fluid discharged from the oil pump 59 is supplied to the torque converter 6, the bypass clutch 18, the input clutch 53, hydraulically operated devices such as the aforesaid hydraulic actuators and lubricating parts after being converted into hydraulic fluid with a specified hydraulic pressure for each device.

Figure 3:
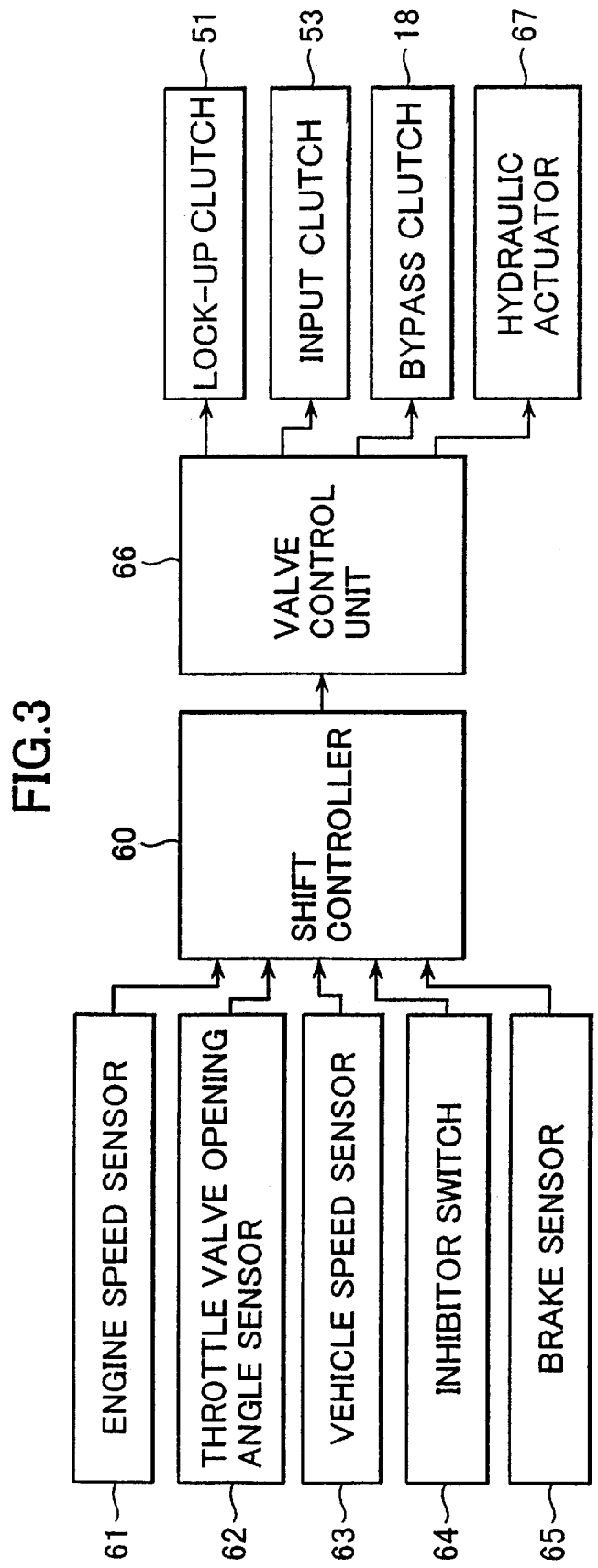
FIG. 3 is a block diagram showing a circuit of a shift control of a transmission system for a vehicle.

Referring to FIG. 3, a shift controller 60 inputs detecting signals indicative of, a rotation speed of the crankshaft 7 from an engine speed sensor 61, a throttle valve opening angle from a throttle valve opening sensor 62, a vehicle speed from a vehicle speed sensor 63, a range of a transmission such as a drive range, a neutral range and the like from an inhibitor switch 64 and a braking operation such as abrupt braking from a brake sensor 65.

Hydraulic pressure for actuating the bypass clutch 18, the lock-up clutch 51 and the input clutch 53 is regulated by an electromagnetic valve provided in a valve control unit 66. The valve control unit 66 is controlled by signals from the shift controller 60. The traveling and engagement of the synchronizer sleeves 31b, 32b and 33b in the axial direction are performed by a plurality of hydraulic actuators 67, to which hydraulic pressure regulated by an electromagnetic valve provided in the valve control unit 66 is supplied.

A shift table parameterizing vehicle speeds, throttle opening angles and the like is stored in a memory provided in the shift controller 60 and the gear shift operation is performed automatically according to the table based on vehicle operating condition indicating signals such as engine speeds, accelerator pedal opening angles, vehicle speeds, revolution numbers of the input shaft, shift positions and the like.

When a selector lever provided in a passenger compartment is positioned at a neutral range under an engine operative condition, both lock-up clutch 51 and input clutch 53 are established in a released condition.

When the selector lever selects a forward drive range, since the selector lever is interlocked with a manual valve (not shown) of a hydraulic control mechanism incorporated in the transmission system, the input clutch 53 is engaged by hydraulic pressure supplied thereto. At this moment, after a hydraulic actuator engages the synchronizer sleeve 31b with the spline 21a to provide the shift gear train for the $1^{st}$ gear ratio with a power transmitting condition, hydraulic pressure is supplied so as to engage the input clutch 53. As a result, engine power is transmitted to the input shaft 3 through the torque converter 6 and the input clutch 53 to drive the vehicle. Then, engine torque transmitted to the input shaft 3 is amplified by the torque converter 6.

As the accelerator pedal opening angle increases, the electronic control throttle valve 2 operates to open and as the vehicle speed increases, up-shifts are performed. When the vehicle speed goes down or when the accelerator pedal is suddenly depressed (kickdown), down-shifts are performed. The gear is shifted automatically according to shift schedules programmed in a memory of the shift controller 60.

At up-shifting, while the input clutch 53 is retained in such a condition as being able to variably transmit torque according to vehicle operating conditions, the bypass clutch 18 starts to be engaged and then is controlled so as to gradually increase transmission torque of the bypass clutch 18. For example, the engine speed is reduced to a specified value corresponding to the $2^{nd}$ gear ratio by controlling the electronic control valve 2 to synchronize and engage the synchronizer sleeve 31b with the spline 22a of the driven gear 22 of the $2^{nd}$ gear ratio. At this moment, when the gear is changed, power is transmitted from the input shaft 3 to the output shaft 4 through the bypass gears 17 and 27 due to the engagement of the bypass clutch 18 without shutting off power of the engine and as a result torque drops can be prevented at shifting gears.

When the vehicle starts, the input clutch 53 is in an engaged condition. Further, when the vehicle travels, the input clutch 53 is also in an engaged condition. When the gear is down-shifted, if the input clutch 53 is in an engaged condition, drag torque retains engine speed in a reduced condition. Hence, at down-shifting, the input clutch 53 is controlled so as to be partially engaged, that is, in a slip condition and as a result it becomes possible to increase the engine speed at down-shifting.

For example, when the vehicle travels at low or medium speed under a high speed stage such as the $4^{th}$ or $5^{th}$ speeds, the riding comfort is exacerbated due to the effect of torque fluctuation at low engine speeds. Under these traveling conditions, when the input clutch 53 is engaged in a minimum torque transmission condition, the input clutch 53 acts as a dumper and the torque fluctuation is prevented from being transmitted to a vehicle drive train. As a result, the riding comfort is prevented from being exacerbated.

Since the lock-up clutch 51 is incorporated in the torque converter 6, in order to supply hydraulic pressure from an electromagnetic valve provided in the valve control unit 66 to the lock-up clutch 51, a long oil delivery path is required. Further, since the lock-up clutch 51 is operated by a pressure difference between the apply chamber 51a and the release chamber 51b, in case where oil temperature is low, it takes a long time for the lock-up clutch 51 to change over from an engaged condition to a released condition due to the effect of viscosity of working fluid. As a result, when the engine speed goes down while the engine is connected with the input shaft 3, engine stalls may occur.

On the other hand, the input clutch 53 is designed such that when hydraulic pressure is supplied to the oil chamber 56a, the input clutch 53 is engaged and when oil is discharged from the oil chamber 56a, the input clutch 53 is released. Furthermore, since the input clutch 53 is disposed in a place close to an electromagnetic valve provided in the valve control unit 66, the oil delivery path from the electromagnetic valve to the input clutch 53 is shorter than that from the electromagnetic valve to the lock-up clutch 51 and as a result the input clutch 53 has a better responsibility than the lock-up clutch 51. Therefore, when abrupt braking is applied, the input clutch 53 is released while the lock-up clutch 51 is engaged. As a result, when the engine speed goes down abruptly, engine stalls can be prevented.

Figure 4:
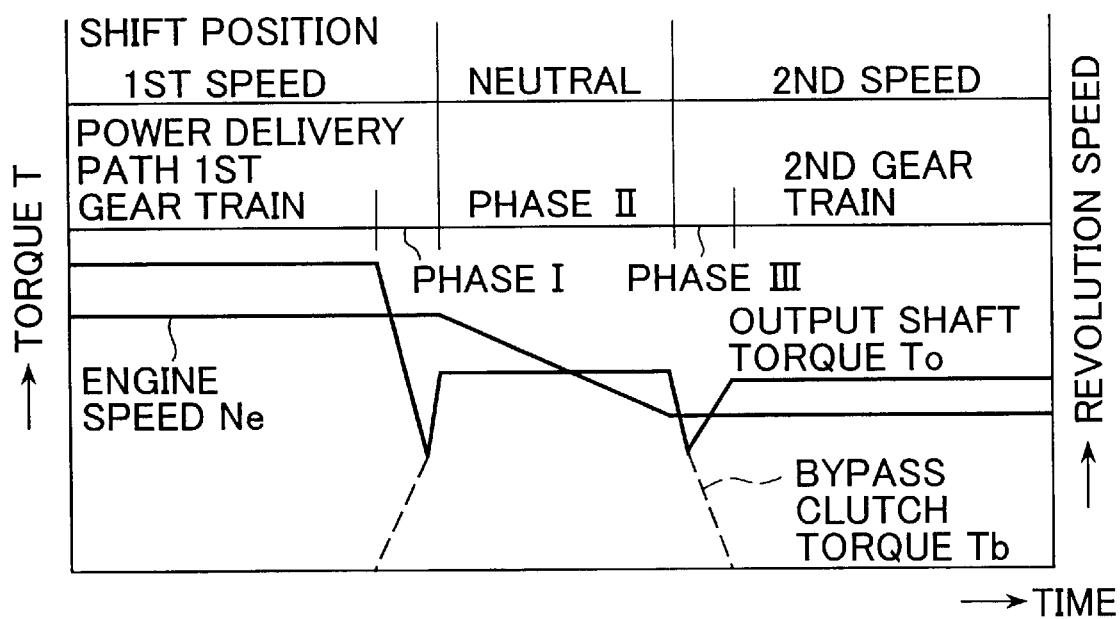
FIG. 4 is a timing chart showing a change of torque of an output shaft and a change of engine speeds at an up-shift from the $1^{st}$ to $2^{nd}$ gear ratio.

FIG. 4 is a timing chart showing the change of a torque To of the output shaft 4 and an engine speed Ne when the gear is up-shifted from the $1^{st}$ to $2^{nd}$ gear ratio.

In the drawing, a shift position of respective gear ratios indicates a position where the synchronizer sleeve 31b is engaged. The synchronizer sleeve 31b travels from a position of the 1$^{st}$ gear ratio to a position of the 2$^{nd}$ gear ratio through a neutral position. The position of 1$^{st}$ gear ratio is a position where the synchronizer sleeve 31b is engaged with the driven gear 21 of 1$^{st}$ gear ratio through the spline 21a and the position of 2$^{nd}$ gear ratio is a position where the synchronizer sleeve 31b is engaged with the drive gear 22 of the 2nd gear ratio through the spline 22a.

When the gear is shifted, first, hydraulic pressure is supplied to the bypass clutch 18 and a condition where power is transmitted through a shift gear train of the 1$^{st}$ gear ratio formed by the drive gear 11 and the driven gear 21 changes to a condition of Phase I where power is transmitted through two power delivery paths, the shift gear train of the 1$^{st}$ gear ratio and the gear train of the bypass gears 17 and 27.

Since the drive gear 11 of the 1$^{st}$ gear ratio driveably meshes with the driven gear 21 and on the other hand the bypass gear 17 drives the bypass gear 27, the bypass gear 17 rotates at a higher speed than the drive gear 11 due to the difference of gear ratios. As a result, torque is transmitted through the gear trains of the bypass gears 17, 27 according to the engagement condition of the bypass clutch 18.

Next, the synchronizer sleeve 31b transfers to a neutral position, namely Phase II condition, in which the synchronizer sleeve 31b meshes only with the synchronizer hub 31a. Under the condition, power is transmitted from the input shaft to the output shaft through the gear train of the bypass gears 17, 27 and at the same time the rotational speed of the input shaft 3 is reduced by the closing operation of the electronic control throttle valve 2 to synchronize the synchronizer sleeve 31a with the spline 22a.

When the engine rotational speed is reduced to a level corresponding to the 2$^{nd}$ speed (speed at the 2$^{nd}$ gear ratio), a condition where the synchronizer sleeve 31b meshes only with the synchronizer hub 31a transfers to a condition where the synchronizer sleeve 31b meshes with both synchronizer hub 31a and spline 22a and is engaged with the spline 22a. As a result, in this Phase III condition, the power delivery path has two paths, one is a shift gear train of the 2$^{nd}$ gear ratio and another is a gear train of the bypass gears 17, 27.

Under the Phase III condition, when hydraulic pressure fed to the bypass clutch 18 is drained to release the bypass clutch 18, an up-shift to the 2$^{nd}$ speed is accomplished and power is transmitted from the input shaft 3 to the output shaft 4 through the gear train of the 2$^{nd}$ gear ratio.

Thus, the bypass clutch control and the engine control are performed simultaneously and when the rotational speed of the engine is reduced to a speed corresponding to the 2$^{nd}$ gear ratio, the synchronizer sleeve 31b meshes with the spline 22a. As a result, gear clash never occurs and the shift operation can be accomplished smoothly. Further, when the synchronizer sleeve 31b is at a neutral position, since power is transmitted through the bypass clutch 18, a so-called "torque drop" can be reduced. Particularly, the torque drop becomes noticeable when the gear is up-shifted from the 1$^{st}$ gear ratio to the 2$^{nd}$ gear ratio or from the 2$^{nd}$ gear ratio to the 3$^{rd}$ gear ratio.

FIG. 4 indicates a change of an output shaft torque and a change of engine speeds when the gear is up-shifted from the 1$^{st}$ to 2$^{nd}$ gear ratios. The shift operation when the gear is up-shifted from one gear ratio to the other gear ratio like from the 2$^{nd}$ to 3$^{rd}$ gear ratio is done similarly. In case where the gear ratio of the bypass gears 17, 27 of the bypass clutch 18 is selected to a value corresponding to that of the 4$^{th}$ speed, when the gear is up-shifted to high speed stages such as from the 4$^{th}$ speed to the 5$^{th}$ speed, the gear may be shifted without involving the bypass clutch 18 (with the bypass clutch 18 released), because the gear ratio of the bypass gears is near to that of the 4$^{th}$ speed and accordingly the drop of driving force is small.

On the other hand, when the gear is down-shifted, since the drop of output torque is not so noticeable, the input clutch 53 may be operated to shut off power transmission to the input shaft 3. Further, also when the gear is down-shifted, the bypass clutch 18 may be engaged while the engine is controlled.

Figure 5:
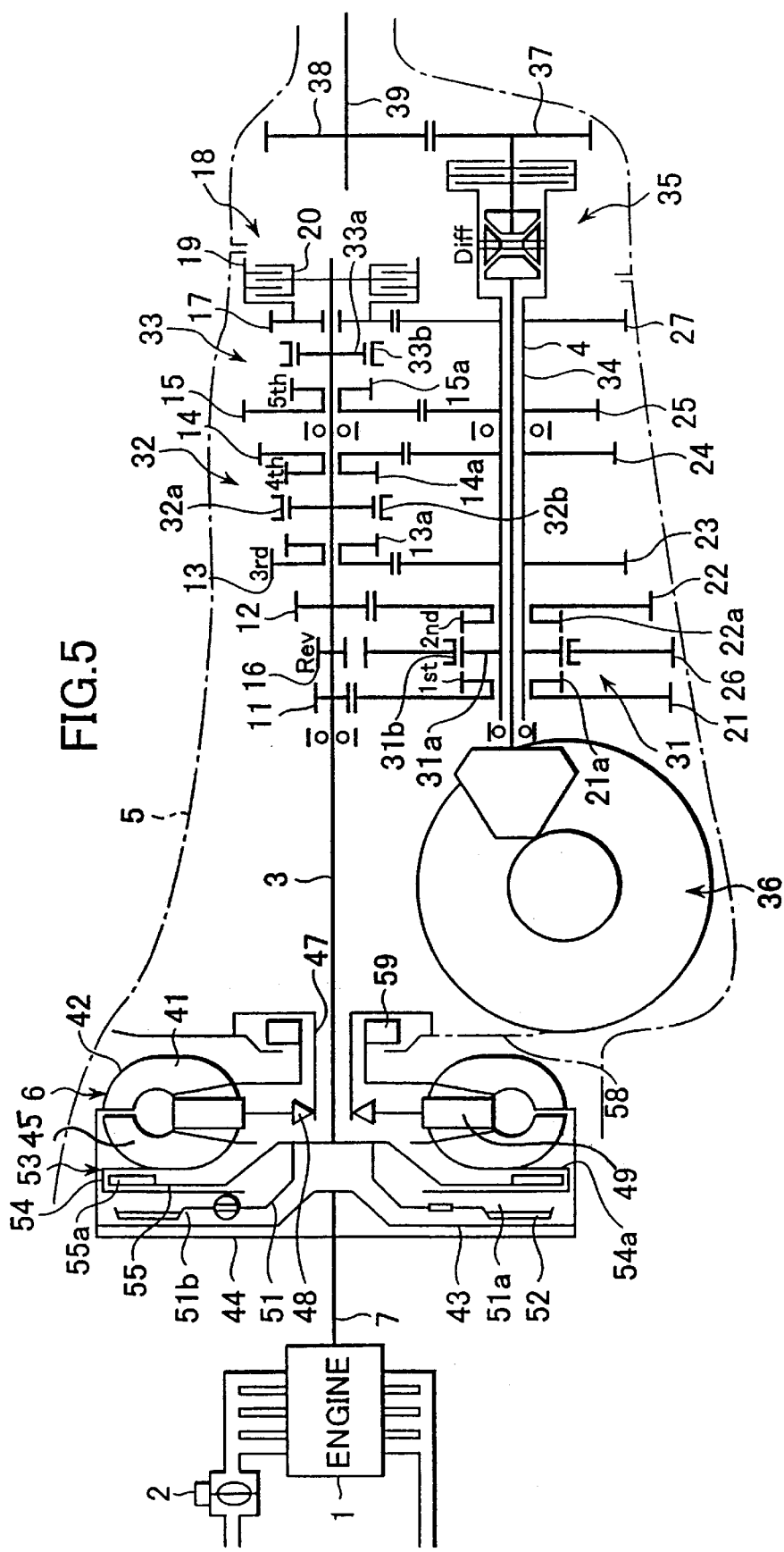
FIG. 5 is a skeleton diagram showing a transmission system for a vehicle according to a second embodiment of the present invention.

FIG. 5 is a skeleton diagram showing a transmission system according to a second embodiment of the present invention. In this transmission system, the lock-up clutch 51 is directly mounted on the input shaft 3. When the lock-up clutch 51 is engaged, the crank shaft 7 is connected to the input shaft 3. The input clutch 53 is incorporated between the outside of the turbine runner 45 and the lock-up clutch 51.

The input clutch 53 has the clutch drum 54 secured to the turbine runner 45 and the clutch hub 55 including the clutch disc 55a opposite to the clutch disc 54a provided on the clutch drum 54 side. The input clutch 53 can be hydraulically controlled independently of circulating fluid within the torque converter 6. Accordingly, the rotation of the turbine runner 45 is transmitted to the input shaft 3 through the input clutch 53. On the other hand, when the input clutch 53 is disengaged and the lock-up clutch 51 is engaged, the rotation of the crankshaft 7 is transmitted directly to the input shaft 3. Also in this transmission system, identical shift operations are performed.

Further, in the transmission system, since the input clutch 53 is incorporated in the torque converter 6 integrally with the lock-up clutch 51, the transmission system can be tailored compactly and as a result it can be applied to a wide variety of transmission types, like longitudinally mounted type or transversely mounted type.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An automatic transmission system for a vehicle, comprising:
    an input shaft,
    an output shaft,
    a plurality of shift gear trains having different gear ratios, said shift gear trains including drive gears mounted on said input shaft and driven gears mounted on said output shaft, said driven gears meshing with said drive gears respectively to form said shift gear trains respectively,
    synchronizing mechanisms for synchronously engaging said drive gears with said input shaft respectively and for synchronously engaging said driven gears with said output shaft respectively,
    a plurality of actuators for respectively operating said synchronizing mechanisms for shifting said shift gear trains;

a torque converter for amplifying an engine power having an output element for outputting said engine power;

a bypass clutch for transmitting said engine power from said input shaft to said output shaft during shift operation of said shift gear trains;

an input clutch for connecting and disconnecting said output element of said torque converter with said input shaft; and a shift controller for automatically controlling said actuators, said input clutch and said bypass clutch to shift said shift gear trains according to a vehicle running condition;

wherein, when said shift controller up-shifts said shift gear trains from a lower-side shift gear train to a higher-side shift gear train, said shift controller engages said bypass clutch to transmit said engine power from said input shaft to said output shaft through the bypass clutch, before disengaging said synchronizing mechanism for the lower-side shift gear train.

2. The automatic transmission system according to claim 1, wherein:

said shift controller engages said input clutch to transmit said engine power from said output element of said torque converter to said input shaft, before engaging said bypass clutch.

3. The automatic transmission system according to claim 2, wherein:

said shift controller disengages said bypass clutch, after engaging said synchronizing mechanism for the higher-side shift gear train.

4. The automatic transmission system according to claim 1, further comprising:

an electronically controlled throttle valve for controlling a rotational speed of the engine, wherein said shift controller reduces said rotational speed of the engine to a level corresponding to a gear ratio of the higher-side shift gear train with said electronically controlled throttle valve, before engaging said synchronizing mechanism for the higher-side shift gear train.

5. The automatic transmission system according to claim 4, wherein:

said shift controller controls said bypass clutch so that a torque transmitted by the bypass clutch is gradually increased, while said shift controller reduces said rotational speed of the engine.

6. The automatic transmission system according to claim 1, further comprising:

a lock-up clutch for connecting and disconnecting the crank shaft of the engine with the output element of the torque converter.

7. The automatic transmission system according to claim 6, wherein:

said lock-up clutch is configured to engage and disengage a front cover of the torque converter connected to the crank shaft of the engine with a turbine shaft of the torque converter, and said input clutch is configured to engage and disengage said turbine shaft of the torque converter with said input shaft.

8. The automatic transmission system according to claim 6, wherein:

said lock-up clutch is configured to connect and disconnect a front cover of the torque converter secured to the crank shaft of the engine to the input shaft, and wherein said input clutch is incorporated between a turbine runner of the torque converter and the lock-up clutch and is configured to connect and disconnect said turbine runner to said input shaft.

9. The automatic transmission system according to claim 1, wherein said bypass clutch further comprises:

a drive-side bypass gear rotatably mounted on the input shaft;

a drive-side bypass gear secured to the output shaft and constantly meshing with said drive-side bypass gear;

a clutch hub fixed to the input shaft and provided with a plurality of drive-side clutch discs; and a clutch drum fixed to the drive-side bypass gear and provided with a plurality of driven-side clutch discs disposed in interleaving relation to the drive-side clutch discs, wherein the engine power is transmitted from the input shaft to the output shaft by pressing the drive-side and driven-side clutch discs in an axial direction of the input shaft.

10. The automatic transmission system according to claim 1, wherein said bypass clutch further comprises:

a drive-side bypass gear secured to the input shaft;

a driven-side bypass gear rotatably mounted on the output shaft and constantly meshing with said drive-side bypass gear;

a clutch hub fixed to the output shaft and provided with a plurality of driven-side clutch discs; and a clutch drum fixed to the driven-side bypass gear and provided with a plurality of drive-side clutch discs disposed in interleaving relation to the driven-side clutch discs, wherein the engine power is transmitted from the input shaft to the output shaft by pressing the drive-side and driven-side clutch discs in the axial direction of the input shaft.

11. The automatic transmission system according to claim 9, wherein:

a gear ratio between the drive-side bypass gear and the driven-side bypass gear is smaller than a $1^{st}$ gear ratio of the shift gear train.

12. The automatic transmission system according to claim 10, wherein:

a gear ratio between the drive-side bypass gear and the driven-side bypass gear is smaller than a $1^{st}$ gear ratio of the shift gear train.

13. The automatic transmission system according to claim 1, wherein:

said synchronizing mechanisms are synchromesh mechanisms.

14. The automatic transmission system according to claim 1, wherein:

said actuators are hydraulic actuators, and oil pressure for the hydraulic actuators is controlled by the shift controller.

* * * * *